United States Patent [19]

Jacobsen et al.

[11] Patent Number: 4,767,973
[45] Date of Patent: Aug. 30, 1988

[54] SYSTEMS AND METHODS FOR SENSING POSITION AND MOVEMENT

[75] Inventors: Stephen C. Jacobsen; Richard P. Phillips; John E. Wood, all of Salt Lake City, Utah

[73] Assignee: Sarcos Incorporated, Salt Lake City, Utah

[21] Appl. No.: 70,349
[22] Filed: Jul. 6, 1987
[51] Int. Cl.$^4$ ................. G01R 29/12; H04R 19/00
[52] U.S. Cl. .................. 318/652; 307/308; 324/457; 357/85
[58] Field of Search ............ 318/652; 357/23.1, 52, 357/53, 85; 307/308; 324/72, 109, 457; 340/870.3

[56] References Cited

U.S. PATENT DOCUMENTS

| | | | |
|---|---|---|---|
| 3,016,752 | 1/1962 | Huebschmann | 73/517 R |
| 3,287,506 | 11/1966 | Hahnlein | 381/173 |
| 3,294,988 | 12/1966 | Packard | 374/177 |
| 3,351,786 | 11/1967 | Muller et al. | 310/319 |
| 3,426,424 | 2/1969 | Touchy | 29/578 |
| 3,436,492 | 4/1969 | Reedyk | 381/175 |
| 3,569,747 | 3/1971 | Siegel | 310/319 |
| 3,585,415 | 6/1971 | Muller | 310/319 |
| 3,585,466 | 6/1971 | Davis et al. | 357/26 |
| 3,612,778 | 10/1971 | Murphy | 381/191 |
| 3,775,572 | 11/1973 | Ishibashi | 381/174 |
| 3,812,575 | 5/1974 | Hedman | 29/594 |
| 3,818,426 | 6/1974 | Bonnet et al. | 367/7 |
| 3,835,264 | 9/1974 | Overby | 381/175 |
| 3,875,433 | 4/1975 | Uchikawa | 307/308 |
| 3,935,481 | 1/1976 | Uchikawa | 307/309 X |
| 3,946,422 | 3/1976 | Yagi et al. | 357/26 |
| 3,973,146 | 8/1976 | Arnold et al. | 357/26 |
| 3,978,508 | 8/1976 | Vilkomerson | 357/26 |
| 4,035,822 | 7/1977 | Vilkomerson | 357/26 |
| 4,035,823 | 7/1977 | Marshall | 357/26 |
| 4,047,214 | 9/1977 | Francombe | 357/26 X |
| 4,104,921 | 8/1978 | Nissl | 73/517 R |
| 4,331,840 | 5/1982 | Murphy et al. | 381/191 X |
| 4,378,510 | 3/1983 | Bennett | 310/329 |
| 4,390,800 | 6/1983 | Tanaka et al. | 307/400 |
| 4,441,038 | 4/1984 | Tanaka et al. | 307/400 |
| 4,443,666 | 4/1984 | Cote | 381/111 |
| 4,447,678 | 5/1984 | Fidi | 181/153 X |
| 4,527,218 | 7/1985 | von Seggern | 307/400 X |
| 4,582,961 | 4/1986 | Frederiksen | 381/174 |
| 4,716,371 | 12/1987 | Blitshteyn et al. | 324/457 |

OTHER PUBLICATIONS

Nathanson et al., "The Rosonant Gate Transistor," *IEEE Trans. on Electron Devices*, ED-14(3):117-133 (Mar. 1967).
Vosburgh et al., "Solid State Surface Charge Sensor," *Rev. Sci. Instrum.*, 47(8):972 (May 1976).
Middlehoek et al., "Silicon Micro-Transducers," *Phys. E: Sci. Instrum.*, 14:1343-1352 (1981).
Horenstein, "Field-Effect Transistor Tracking Surface Field Sensor," *Rev. Sci. Instrum.*, 55(2):222-225 (Oct. 1983).
Bergveld, "The Impact of MOSFET-Based Sensors," *Sensors and Actuators*, 8:109-127 (1985).
Voorthutzen et al., "Theoretical Consideration in the Design of Integrated Semiconductor Sensors Applying Electrets," *IEEE Trans. Electron Devices*, ED-32(7):11-85-1190 (Jul. 1985).

*Primary Examiner*—Bentsu Ro
*Attorney, Agent, or Firm*—Workman, Nydegger & Jensen

[57] ABSTRACT

Sensor systems and methods for detecting the position and/or movement of an object in multiple degrees of freedom. The sensor system of the present invention comprises at least one field-effect transistor (FET), the geometrical configuration of the FET being selected so as to provide the desired sensitivity. The FET is preferably provided with a conductive gate adjacent to but insulated from the channel region of the FET. An object whose position and/or movement is to be detected is prepared such that an electric field emanates from the object.

The FET is brought into the vicinity of the object, and the electric field emanating from the object interacts with the gate and/or channel region of the FET so as to modify the magnitude of the electrical current flowing through the channel region. The current through the channel region is detected and is used to obtain information about the position and movement of the object relative to the channel region of the FET. By positioning a plurality of substantially coplanar FETs in the vicinity of the object, the position and/or movement of the object in any desired number of degrees of freedom can be detected and monitored.

44 Claims, 5 Drawing Sheets

SYSTEMS AND METHODS FOR SENSING POSITION AND MOVEMENT

BACKGROUND

1. The Field of the Invention

This invention relates to sensor devices and, more particularly, to novel systems and methods for sensing the position and/or movement of an object in multiple degrees of freedom.

2. The Prior Art

In the operation of electrical and electro-mechanical systems, it is often necessary or desirable to detect and/or continuously monitor the position, movement, and/or orientation of an object. Such sensing and/or monitoring is, in fact, essential for the proper operation of many such systems.

For example, pressure gauges and strain gauges commonly use the position of an object as an indication of pressure or strain. Such a gauge might include a membrane or other member which is deflected in accordance with the pressure or strain being experienced. Accordingly, the gauge must necessarily include some means for detecting the position of the membrane or other member such that the pressure or strain can be accurately determined.

Similarly, accelerometers and gyroscopes typically use the position, movement, and/or orientation of some internal member to detect and measure acceleration and/or a change in orientation. An accelerometer may, for example, include a member which is displaced from some reference position whenever the accelerometer experiences an acceleration. In such cases, the accelerometer also requires a means for detecting the magnitude and direction of the displacement of the object, from which the magnitude and direction of the acceleration can then be determined.

A conventional phonograph also must include some type of device for sensing movement. As the phonograph needle travels along the grooves of a phonograph record, the needle vibrates in accordance with the sounds which have been stored on the record. Some type of device is thus required to detect the vibrations of the phonograph needle such that the vibrations can be converted into audible sounds.

The recent technological growth in the field of robotics and in the development of limb prostheses has given rise to an even greater need for various types of sensors. A sensor is, for example, often used to indicate that a robot or prosthetic limb has contacted or is "touching" an object. In many cases, it is desirable that the sensor also be capable of detecting the magnitude of the pressure which is being applied to the object. In addition, sensors are frequently used to monitor the position and orientation of each of the various component parts of a robot or prosthetic limb. The information obtained from all of the sensors is then provided to some type of control system.

In an effort to provide sensors suitable for use in applications such as those outlined above, those skilled in the art have developed a number of different kinds of devices for sensing position and/or movement. A few of the most common types of devices are described generally below.

Most of the early position sensor devices were mechanical in nature, and such devices are still in wide use today. In mechanical sensor devices, the object whose position or movement is to be sensed is typically physically connected to a pointer, a dial, or some other type of visual indicator. Movement of the object is thus transmitted mechanically to the pointer or dial. The position and movement of the pointer or dial is then periodically observed, and the position and/or movement of the object can thereby be determined.

While mechanical sensor devices are adequate for many applications, such devices are not well suited to automation since the "output" of such devices must generally be perceived visually. Accordingly, those skilled in the art have developed a number of sensor devices which instead provide some type of electrical output.

One relatively simple sensor device which provides an electrical output includes a capacitor which is coupled in some way to the object whose position and/or movement is to be sensed. The capacitor is typically coupled to the object in such a way that movement of the object changes the net electrical charge on the plates of the capacitor. For example, the object may be connected to one of the parallel plates of a capacitor, while the other plate of the capacitor remains fixed; the voltage between the two plates of the capacitor is kept constant. Movement of the object thus changes both the distance between the plates of the capacitor and, as a result, the net electrical charge on each of the capacitor plates. Such a change in the net charge can then be detected and monitored using known high impedance amplifying and tuning circuitry.

Other prior art sensor devices which provide an electrical output detect the position and/or movement of an object using optics. Such optical sensor devices have a number of different configurations.

For example, an optical sensor device may include a light source which is attached to or reflected from the object whose position is to be sensed. The device also includes one or more light-sensitive components, such as, for example, photocells, photodiodes, lateral effect photodiodes, or photoconductive sheets or layers of some sort. The light-sensitive components are appropriately positioned around the object to be sensed so as to interact with the light emanating or reflected from the object. The electrical output response of the light-sensitive components is then used to provide an indication of the position and/or movement of the object.

A prior art optical sensor device might also be configured as an interferrometer. Basically, an interferrometer is a device which can be used to measure changes in distance with a high degree of accuracy by detecting phase/amplitude relationships resulting from interacting light waves.

For example, light emanating from a coherent light source may be split into two separate beams. One beam is then reflected from a mirror which is attached to the object whose position is to be sensed, and the other beam is reflected from a stationary mirror. The two beams are then recombined into a single beam. The recombined beam will have certain phase/amplitude characteristics which are dependent upon the relative distance which was traveled by the two beams separately. A light-sensitive component, such as those identified above, is then used to detect such phase/amplitude characteristics in the recombined beam, the output of the light-sensitive component providing an indication of any changes in the object's position.

Some prior devices have included radioactive sensors to detect and monitor position. In one such device, which comprises an accelerometer, a radioactive sphere is positioned within a chamber. Radioactive particles emanating from the sphere are detected by a pair of beta-sensitive diodes located behind a slit system. The intensity of the beta radiation on the diodes is used to indicate the position of the sphere within the chamber.

RADAR and SONAR techniques are also widely used in the prior art to detect position and/or movement. Using such techniques, radio or sound waves are first transmitted toward an object. The radio or sound waves which are reflected by the object are then analyzed in order to determine the position and/or movement of the object.

Despite the sophistication and number of the prior art sensor devices available, the prior art devices and methods suffer from a number of significant disadvantages.

For example, prior art sensor devices are generally limited to detecting position, movement, and/or orientation of an object in only one degree of freedom. That is, the prior art devices and methods are typically limited to sensing position and movement in only one dimension, such as along a particular line. Consequently, in order to use the prior art devices and methods to detect motion in multiple degrees of freedom (such as, for example, to fix the position of an object in three-dimensional space), a cumbersome and expensive support structure is generally required which will accommodate the placement of numerous sensors at various positions spacially around an object.

Most prior art sensor devices are also relatively complex and require elaborate support systems in order to function properly. This is particularly true in the case of the optical sensor devices described above. The complexity of the prior art devices and methods increases the likelihood that such devices and methods will malfunction. Such complexity also significantly increases the cost of manufacturing and using the prior art devices.

In addition, the prior art sensor devices are generally relatively large. In many cases, however, it is desirable to use sensor devices which are very small. Such is particularly the case, for example, in the fields of robotics and of limb prostheses. In these fields of application, the large size of the sensor devices is often a significant disadvantage and can significantly hinder the effective development and operation of robotic and prosthetic apparatus.

Another disadvantage of the prior art sensor devices described above is that they are not well suited for use in association with semiconductors. It is well known that light will modify the performance characteristics of semiconductors. Therefore, if semiconductor technology is to be used in connection with the prior art sensor devices, potentially expensive and tedious shielding must generally be provided in order to protect the semiconductor elements from exposure to light.

Further, while it is often desirable to use a sensor device in association with some type of integrated circuitry, the prior art sensor devices are typically not well adapted for use with conventional integrated circuits. Most prior art sensor devices cannot be manufactured using conventional integrated circuit technology. Such sensor devices cannot, therefore, be readily manufactured in direct association with integrated circuits but must be manufactured separately and thereafter connected to the desired integrated circuits. As a result, the cost of manufacturing and assembling the prior art sensor devices in association with integrated circuits is significantly increased.

BRIEF SUMMARY AND OBJECTS OF THE INVENTION

In view of the foregoing, it is a primary object of the present invention to provide a system and method for sensing the position and/or movement of an object in multiple degrees of freedom.

It is also an object of the present invention to provide a position sensor system and method which is both simple and inexpensive in construction and use.

It is a further object of the present invention to provide a position sensor system which is capable of being manufactured and used on a very small scale.

It is a still further object of the present invention to provide a position sensor system which is readily adapted for manufacture and use in association with semiconductors and conventional integrated circuits.

Also, it is an object of the present invention to provide a position sensor system and method which is not unduly affected by the presence of common impurities, such as, for example, sodium chloride (NaCl).

Consistent with the foregoing objects, the present invention is directed to sensor systems and methods which are capable of sensing the position and movement of an object in multiple degrees of freedom and which can be manufactured on an extremely small scale using conventional integrated circuit (IC) technology.

The sensor system of the present invention comprises at least one field-effect transistor (FET). The FET is preferably provided with a conductive gate adjacent to but insulated from the channel region of the FET. Optionally, in order to prevent the performance characteristics of the FET from being modified as a result of contamination of the gate with impurities, the conductive gate of the FET may be substantially completely surrounded by an insulating material.

The object whose position and/or movement is to be detected is first prepared such that an electric field emanates from the object. The FET is thereafter brought into the vicinity of the object. The electric field emanating from the object interacts with the gate and/or channel region of the FET so as to modify the magnitude of the electrical current flowing through the channel region. The current through the channel region is then detected and is used to obtain information about the position and movement of the object relative to the channel region of the FET. Significantly, by positioning a plurality of substantially coplanar FETs in the vicinity of the object, the position and/or movement of the object in any desired number of degrees of freedom can be detected and monitored.

These and other objects and features of the present invention will become more fully apparent from the following description and appended claims, taken in conjunction with the accompanying drawings.

DETAILED DESCRIPTION OF THE PREFERRED EMBODIMENTS

It will be readily appreciated that the components of the present invention, as generally described and illustrated in the figures herein, could be arranged and designed in a wide variety of different configurations. Thus, the following more detailed description of the presently preferred embodiments of the position sensor systems and methods of the present invention, as represented in FIGS. 1 through 15A, is not intended to limit the scope of the invention, as claimed, but it is merely representative of the presently preferred embodiments of the invention.

The presently preferred embodiments of the invention will be best understood by reference to the drawings, wherein like parts are designated with like numerals throughout.

1. General Discussion

Figure 1:
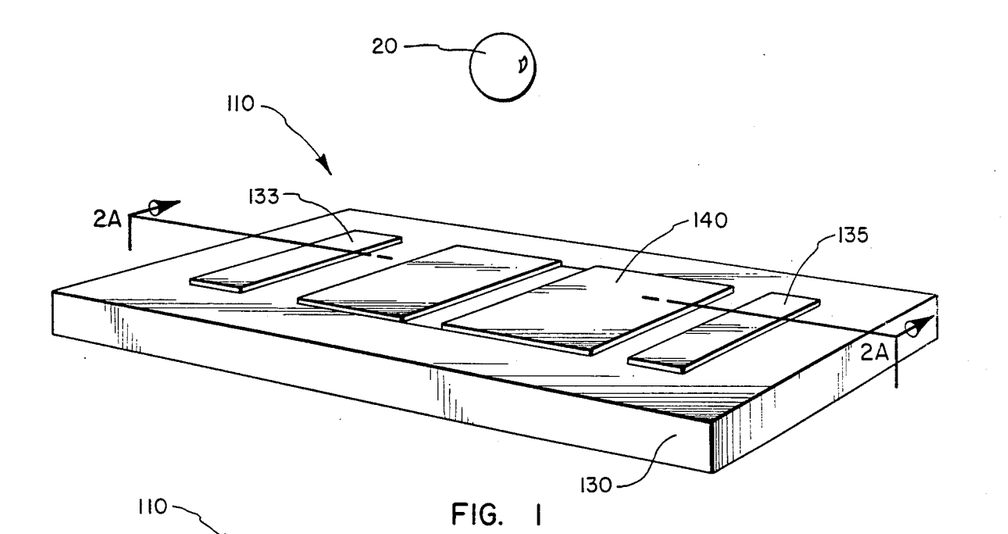
FIG. 1 is a perspective view of one presently preferred embodiment of the position sensor system of the present invention.

One presently preferred embodiment of the position sensor system of the present invention is illustrated in FIG. 1. As shown, the position sensor system comprises an object 20 and a field-effect transistor 110 (hereinafter referred to as an "FET").

The object 20 whose position and/or movement is to be detected is formed or prepared such that an electric field emanates from object 20. Such electric field is illustrated schematically by lines 14 and 16 in FIGS. 2A and 2B, respectively.

FET 110 preferably comprises a conductive gate 140 which interacts with the electric field emanating from object 20. The degree of interaction between gate 140 and the electric field is measured and is used to obtain information about the position and/or movement of object 20 relative to FET 110.

Figure 2A:
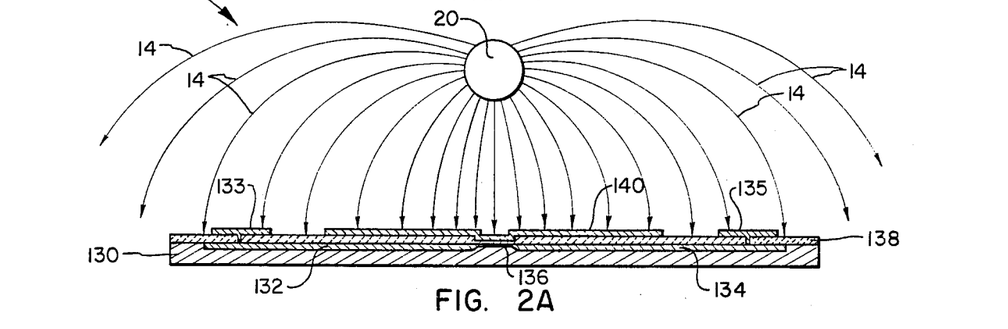
FIG. 2A is a cross-sectional view of the embodiment of FIG. 1 taken along lines 2A—2A of FIG. 1 and illustrating the interaction of the sensor device with the electric field emanating from the object being sensed.
Figure 2B:
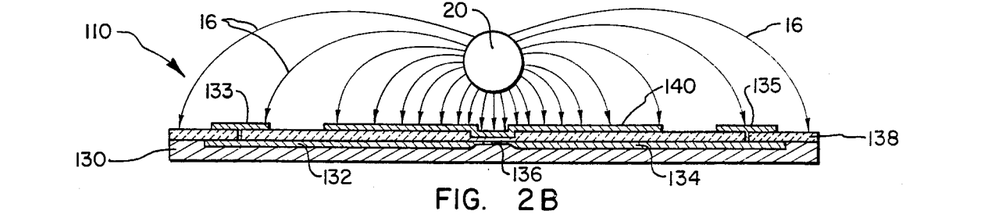
FIG. 2B is a cross-sectional view similar to FIG. 2A wherein the object being sensed is nearer the sensor device.

Referring now to FIGS. 2A and 2B, FET 110 comprises two conductive regions 132 and 134 which are called the drain and source regions, respectively. Drain region 132 and source region 134 are separated by a narrow channel region 136 which is also conductive. Drain region 132 and source region 134 are typically maintained at different electrical potentials, thereby causing an electrical current to flow between drain region 132 and source region 134 through channel region 136.

As the electric field emanating from object 20 interacts with gate 140 of FET 110, an electrical charge is induced on the surface of gate 140. Such surface charge modifies the conductivity of channel region 136 of FET 110 and thus influences the magnitude of the electrical current which flows between drain region 132 and source region 134.

The mobile electrical charge carriers within regions 132, 134, and 136 of FET 110 may be either positively or negatively charged. If such charge carriers are, for example, negatively charged, the electric field emanating from object 20 might be produced by placing a negative net electrical charge within or upon the surface of object 20. In such case, as electric field 14 (see FIG. 2A) interacts with gate 140 of FET 110, a negative electrical charge is induced upon the surface of gate 140 which is adjacent channel 136. The negative surface charge on gate 140 repels the negative charge carriers within channel region 136 of FET 110, thereby making channel region 136 less conductive. Further, as a result of fewer available charge carriers within channel region 136, less electrical current flows between drain region 132 and source region 134 of FET 110 than would be the case if object 20 were not in the vicinity of FET 110.

FIG. 2B illustrates what happens when object 20 is positioned closer to FET 110. As shown, electric field 16 now interacts more intensely with gate 140 of FET 110. As a result, the magnitude of the surface charge induced on gate 140 of FET 110 is greater, and this causes an increased repulsion of the negative charge carriers within channel region 136. Therefore, the current flowing between drain region 132 and source region 134 of FET 110 is less when object 20 is positioned as illustrated in FIG. 2B than was the case when object 20 was positioned as illustrated in FIG. 2A.

Accordingly, by monitoring the current flowing between drain region 132 and source region 134 of FET 110, the position of object 20 relative to FET 110 may be detected and/or continuously monitored. Moreover, as will become more apparent from the discussion which follows, by using a plurality of FETs 110 positioned in the vicinity of object 20, it is possible to positively determine and monitor the position and movement of object 20 in any desired number of degrees of freedom.

A further understanding of the operation and use of the position sensor system of the present invention can be obtained by examining the mathematical equations which represent the system's operation. An examination of such equations will also illustrate how the magnitude of the electrical current flowing between drain region 132 and source region 134 of FET 110 can be used to obtain information about the position of object 20. Accordingly, a brief derivation of the pertinent equations for one simplified case is set forth below.

In conventional use, the current between the source region and drain region of an FET is modified by applying a voltage to the gate of the FET. Thus, for example, if the channel region of an FET is substantially rectangular, the current ($I_d$) flowing between the source region and drain region of the FET can be approximated by the following equation:

$$I_D = \mu_n \frac{W}{L} C_{ox}(V_G - V_{th}(V_B))(V_D - V_S); \quad (1)$$

where $\mu_n$ = electron mobility in channel (cm$^2$/volt-sec.)
W = channel width (cm)
L = channel length (cm)
$C'_{ox}$ = metal-oxide-semiconductor ("MOS") capacitance (farad/cm$^2$)
$V_G$ = gate voltage (volt)
$V_{th}$ = threshhold voltage (volt)
$V_B$ = body (substrate) voltage (volt)
$V_D$ = drain voltage (volt)
$V_S$ = source voltage (volt)

The expression "$C'_{ox}(V_G - V_{th}(V_B))$" in equation (1) will be recognized by those skilled in the art as representing the surface charge density on the gate of the FET which is associated with the voltage ($V_G$) being applied to the gate. In the case of FET 110 of FIG. 1, however, the surface charge density on gate 140 is not changed by applying a voltage ($V_G$) to gate 140. Rather, the voltage ($V_G$) on gate 140 is used to describe the initial surface charge density on gate 140. The surface charge density on gate 140 of FET 110 is, then changed by means of electric field 14 (FIG. 2A) which interacts with gate 140 so as to induce an additional surface charge on gate 140.

Consistent with the foregoing, the operation of FET 110 can be more accurately characterized by modifying equation (1) so as to include an additional term representing the surface charge density induced on gate 140 by the electric field 14. The modified equation, which, notably, is a linear equation in the operating range of interest, is as follows:

$$I_D = \mu_n \frac{W}{L} [Q'_{ind} + C'_{ox}(V_G - V_{th}(V_B))](V_D - V_S); \quad (2)$$

where $Q'_{ind}$ = surface charge induced in the gate (coulomb/cm$^2$)

Equation (2) can be simplified, as follows:

$$I_D = I_D^o + \mu_n \frac{W}{L} (V_D - V_S)Q'_{ind} \quad (3)$$

where $I_D^o$ = source to drain current in absence of an external electric field The magnitude of the electrical charge ($Q'_{ind}$) which is induced on the surface of gate 140 by electric field 14 depends, of course, upon the particular configuration of electric field 14.

For example, if an electric field is produced by an infinite line of charge, the electric field (E) can be represented by the following equation:

$$E = \frac{\lambda}{2\pi r} \quad (4)$$

where
$\lambda$ = line charge density (coulomb/cm)
r = distance from line of charge (cm)

In such case, the surface charge density ($\sigma_{ind}$) induced in a conductive plane which is substantially parallel to the line of charge can be represented, as follows:

$$\sigma_{ind} = -\frac{\lambda h}{\pi(h^2 + y^2)} \quad (5)$$

where
h = height of line above conductive plane (cm)
y = lateral distance from line along conductive plane (cm)

The total surface charge ($Q_{ind}$) which is induced in a rectangular region of the conductive plane having width, W, and length, L, can be calculated using equation (5), as follows:

$$Q_{ind} = L \int_{-\frac{W}{2}}^{\frac{W}{2}} \sigma_{ind} dy \quad (6)$$

$$Q'_{ind} = -\frac{2\lambda L}{\pi} \tan^{-1}\left(\frac{W}{2h}\right) \quad (7)$$

The average surface charge density induced in the rectangular region of the conductive plane is equal to the total charge surface density ($Q_{ind}$) divided by the area of the rectangular region (WL). Thus, the average surface charge density ($Q'_{ind}$) as calculated from equation (7) is as follows:

$$Q'_{ind} = -\frac{2\lambda}{W\pi} \tan^{-1}\left(\frac{W}{2h}\right) \quad (8)$$

Equation (8) can now be combined with equation (3) to obtain a representation of the current which would flow between drain region 132 and source region 134 of FET 110 if an infinite line of charge is positioned in the vicinity of FET 110. The resultant equation is as follows:

$$I_D = I_D^o - \frac{2\mu_n \lambda (V_D - V_S)}{\pi L} \tan^{-1}\left(\frac{W}{2h}\right) \quad (9)$$

Using equation (9), the height of a line of charge above channel region 136 of FET 110 can be calculated from a measurement of the electrical current ($I_d$) flowing between drain region 132 and source region 134 of FET 110. Similar equations can be derived for other electric field configurations.

2. FET Sensor Configuration

The FET position sensor of the present invention may have any of a number of different geometrical configurations. The particular configuration which is chosen will, in large measure, depend upon the specific application to which the overall position sensor system will be put. One presently preferred FET configuration for a position sensor system within the scope of the present invention is designated generally at 110 and is illustrated in FIGS. 1, 2A and 2B.

As shown best in FIGS. 2A and 2B, FET 110 comprises a doped semiconductor substrate 130. Substrate 130 may, for example, comprise a silicon crystal which has been grown under controlled conditions so as to be substantially free from unwanted impurities.

Substrate 130 includes two regions 132 and 134 which are doped with some type of impurity so as to have a plurality of free charge carriers. Regions 132 and 134 are separated by a channel region 136 which is also lightly doped so as to likewise be provided with numerous free charge carriers. The free charge carriers can be either positive or negative charge carriers.

The physical dimensions of regions 132, 134, and 136 are preferably quite small. For example, regions 132 and 134 may penetrate into substrate 130 a distance of approximately two to three microns, while region 136 penetrates into substrate 130 a distance of approximately one micron. In addition, the distance between regions 132 and 134 (sometimes referred to as the "length" of the channel region 136), may be as little as approximately 0.5 microns or may, for example, be up to approximately 40 microns. At the same time, the "width" of region 136 may, for example, be within the range of from approximately 0.5 microns to approximately 500 microns.

It is generally known that the mobility of negative charge carriers within a semiconductor material is greater than that of positive charge carriers. Therefore, it is presently preferred that the impurity which is used to dope regions 132, 134, and 136 be of a type that provides such regions with excess negative charge carriers. Such an impurity is commonly referred to as an "n-type impurity," and FET 110 is then referred to as an "n-channel" FET. A suitable n-type impurity may, for example, comprise arsenic, antimony and/or phosphorus.

As further illustrated in FIGS. 2A and 2B, substrate 130 is provided with a layer 138 of insulating material. Layer 138 may, for example, comprise silicon dioxide or silicon nitride. Layer 138 is preferably quite thin. For example, layer 138 may be approximately one micron thick. Optionally, adjacent channel region 136, layer 138 may have a smaller thickness, as shown, such as, for example, 0.1 microns.

FET 110 is also provided with two conductive regions 133 and 135. Regins 133 and 135 are contact pads which extend through layer 138, as shown, and make electrical contact with regions 132 and 134 of substrate 130. Contact pads 133 and 135 thus provide a means for making electrical contact with regions 132 and 134, respectively.

Preferably, FET 110 also includes a conductive region 140. Conductive region 140 is the gate of FET 110 and is configured so as to extend over channel region 136 and over portions of both regions 132 and 134. Gate 140 is preferably electrically insulated from substrate 130 by layer 138.

Conductive regions 133, 135, and 140 may be formed of any suitable conductive material. For example, conductive regions 133, 135, and 140, may be formed of aluminum.

Figure 3:
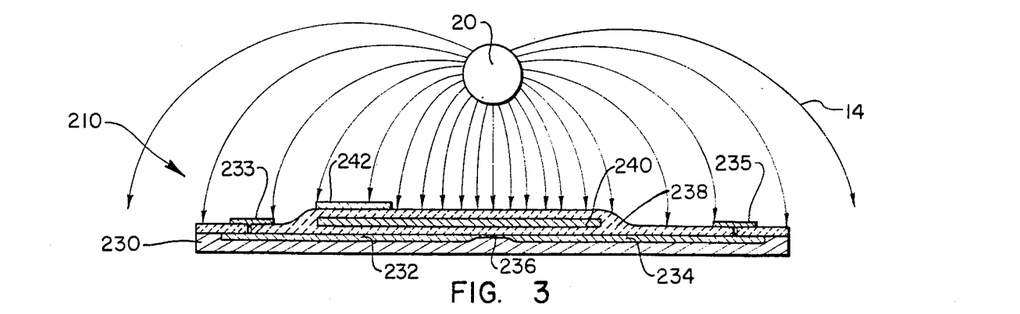
FIG. 3 is a cross-sectional view similar to FIG. 2A illustrating a second presently preferred embodiment of the position sensor system of the present invention.

A second presently preferred embodiment of an FET for use in a position sensor system within the scope of the present invention is designated generally at 210 and is illustrated in FIG. 3. As with FET 110, FET 210 comprises a semiconductor substrate 230 which includes doped regions 232, 234, and 236. Substrate 230 and regions 232, 234, and 236 are substantially identical to substrate 130 and regions 132, 134, and 136, respectively, which have been described above in connection with FIGS. 1, 2A and 2B.

Substrate 230 of FET 110 is provided with an insulating layer 238 which may, for example, like layer 138 of sensor 110, be formed of silicon dioxide or silicon nitride. Also, conductive regions 233 and 235 are positioned on top of insulating layer 238 and extend through layer 238, as shown, so as to provide electrical contact with regions 232 and 234, respectively. Conductive regions 233 and 235 are substantially identical to conductive regions 133 and 135 described above in connection with FIGS. 1, 2A and 2B.

Embedded within layer 238 of FET 210 is a conductive region or gate 240. Gate 240 of FET 210 corresponds to gate 140 of FET 110. Gate 240 is electrically insulated from substrate 230 by insulating layer 238. In addition, insulating layer 238 substantially completely surrounds gate 240 so as to insulate gate 240 from the regions surrounding FET 210.

In some applications, the position sensor system of the present invention might be used in an environment which has some impurities. Such impurities may, for example, quite commonly include sodium ions or other changed particles. If such impurities are allowed to come into contact with the portion of layer 238 which is immediately adjacent channel 236 of the FET sensor, the impurities might be adsorbed by such portions of layer 238. This would alter the performance characteristics of the FET and would consequently distort the position information obtained.

In order to avoid the foregoing problem, an FET 210 which is configured as illustrated in FIG. 3 can be used. Gate 240 of FET 210 is completely surrounded by an insulating layer 238. As a result, impurities cannot come into contact with and be adsorbed by that portion of layer 238 which is immediately adjacent channel 236. Therefore, FET 210 may be reliably used in environments which contain impurities.

Gate 240 of FET 210 may be formed of any suitable material. For example, gate 240 may be formed of a polycrystalline silicon material. Such a polycrystalline silicon gate 240 may be provided within layer 238 by means which are well-known in the semiconductor industry.

As further depicted in FIG. 3, gate 240 may be formed so as to be asymmetrical. That is, a larger portion of gate 240 extends over the top of region 232 than extends over the top of region 234. In addition, a conductive region or biasing contact 242 may be positioned on top of layer 238 so as to be adjacent the larger portion of gate 240. Biasing contact 242 can advantageously be used to modify the current flowing through FET 210 in certain cases.

From equation (2) above, it is apparent that the current ($I_d$) through an FET can be modified by changing the threshold voltage ($V_{th}$) of the FET, the threshold voltage being a function of the voltage ($V_B$) on the FET substrate. Thus, for example, the voltage ($V_B$) on substrate 230 of FET 210 could be adjusted such that the current ($I_d$) flowing through FET 210 is equal to a desired reference value when object 20 is located at a desired reference position.

In many cases, however, a number of other circuit components may be provided on substrate 230 in association with FET 210. The voltage ($V_B$) on substrate 230 could not, therefore, be arbitrarily varied without affecting the operation of such other circuit components. In such cases, a voltage could be placed on biasing contact 242 so as to induce a surface change on gate 240 of FET 210 and thereby modify the current ($I_d$) flowing through FET 210. The voltage on contact 242 could, for example, be selected such that the current ($I_d$) flowing through FET 210 is equal to a desired reference value when object 20 is located at a desired reference position. In this way, biasing contact 242 can be used to establish a reference position from which the position of object 20 is determined.

Figure 4:
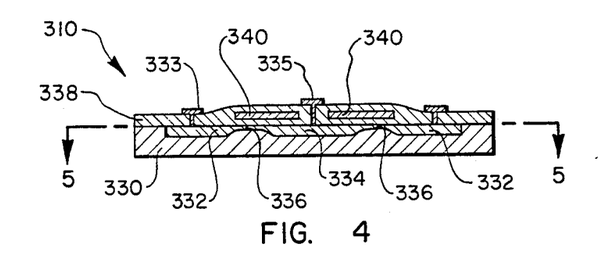
FIG. 4 is a cross-sectional view of a third presently preferred embodiment of the position sensor system of the present invention.
Figure 5:
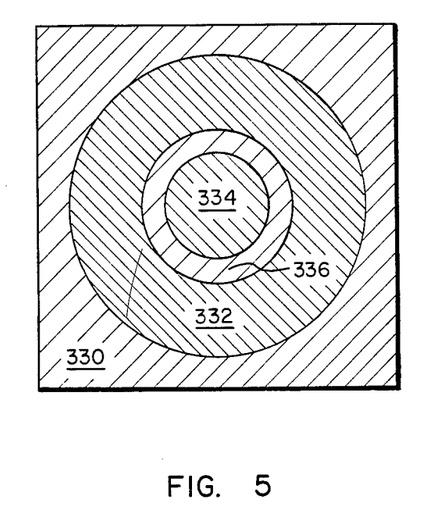
FIG. 5 is a top plan view of the embodiment of FIG. 4 taken along the cross-sectional lines 5—5 of FIG. 4.

A third presently preferred embodiment of an FET for a position sensor system within the scope of the present invention is designated generally at 310 and is illustrated in FIGS. 4 and 5. As shown, FET 310 is formed so as to have a substantially annular configuration.

As with FET 110, FET 310 comprises a semiconductor substrate 330 and doped regions 332, 334, and 336. Substrate 330 corresponds in form and function to substrate 130 described above in connection with FET 110. Likewise, regions 332, 334, and 336 of FET 310 correspond to regions 132, 134, and 136, respectively, of FET 110. However, regions 332, 334, and 336 have an annular configuration, as shown best in FIG. 5.

Substrate 330 of FET 310 is also provided with an insulating layer 338. Layer 338 is virtually identical to layer 238 of FET 210, which is described above in connection with FIG. 3. Conductive regions 333 and 335 are provided on top of layer 338, as shown, and extend through layer 338 so as to provide electrical contact with regions 332 and 334, respectively. Conductive regions 333 and 335 are substantially identical to regions 133 and 135 of FET 110 described above.

Embedded within layer 338 of FET 310 is a conductive region or gate 340. Gate 340 is substantially annular in configuration and, like gate 240 of FET 210, may, for example, be formed of a polycrystalline silicon material.

A primary advantage of FET 310 results from the fact that channel region 336 of FET 310 does not have any "corners" which must be accounted for in determining the position of an object. This greatly simplifies the analysis which is required in order to determine the position of an object with respect to FET 310 and allows FET 310 to function as a substantially omni-directional position sensor.

For example, the object 20 whose position is to be determined may be configured as a uniformly charged sphere, as illustrated in FIG. 1. FET 110 of FIG. 1 may then be used to detect the position of object 20. In such case, however, because channel region 136 (see FIG. 2A) of FET 110 is rectangular, the response of FET 110 will depend both upon the distance between object 20 and FET 110 and upon the rotational orientation of FET 110 with respect to object 20.

The response of FET 310 to object 20, on the other hand, would be much simpler. The active regions of FET 310 do not have "corners." Thus, the response of FET 310 to object 20 would not depend upon the rotational orientation of FET 310 with respect to object 20. Rather, the response of FET 310 to object 20 would depend soley upon the distance between object 20 and FET 310. As a result, it will be appreciated that the analysis which is involved in determining the position of an object can be simplified significantly by using an FET 310 which has an annular configuration.

The above-described embodiments illustrate only a few of the possible configurations for the FET sensor of the present invention. Those skilled in the art will readily appreciate that the FET sensor may have a virtually limitless number of different geometrical configurations. Significantly, the size and geometry of the FET sensor will affect the sensor's sensitivity. Thus, the configuration of the FET sensor may be modified for a particular application so as to better satisfy the specific sensitivity and spacial requirements.

3. FET Sensor Fabrication

The FET position sensor of the present invention may be fabricated as an insulated gate FET using conventional semiconductor technology. For illustration purposes, a description of one possible method for fabricating the FET 110 illustrated in FIGS. 1, 2A and 2B is set forth briefly below.

First, a silicon crystal wafer 130 is grown under controlled conditions so as to be virtually free from unwanted impurities. Silicon wafer 130 is then exposed to oxygen gas at high temperatures on the order of 1000° C. to 1100° C. Such exposure will cause a thin, uniform layer 138 of silicon dioxide to "grow" on the surface of wafer 130.

After cooling, the silicon dioxide layer 138 is coated with an organic photosensitive material, commonly called "photoresist." A suitable photoresist material is, for example, currently manufactured and distributed by Shipley Company of Newton, Mass. as Stock No. AZ 1375. The photoresist material is then dried and baked onto silicon dioxide layer 138 at temperatures on the order of 250° C.

Once the photoresist material has been applied to layer 138, a mask is placed on top of layer 138. The mask is a form of "stencil" which defines regions 132 and 134 of FET 110.

With the mask in place, ultraviolet light, x-rays, or some other type of ionizing radiation is applied. The mask allows the ionizing radiation to contact only certain specified portions of layer 138 and provides a shield for the other portions. For example, the mask might be configured so as to permit the radiation to contact only those portions of layer 138 which lie adjacent regions 132 and 134 of wafer 130. In such case, the photoresist material used would be of a type which breaks down into smaller molecules upon exposure to the radiation.

Wafer 130 is next immersed in a solvent so as to wash away the "developed" photoresist material, thereby exposing the portions of layer 138 underneath the developed photoresist material. The result is that the photoresist material immediately above regions 132 and 134 of wafer 130 is washed away, while the other portions of wafer 130 remain covered with the photoresist material.

Wafer 130 is then exposed to an etching substance, such as, for example, hydrofluoric acid. The etching substance dissolves the exposed portions of layer 138 but has no effect upon wafer 130 or upon those portions of layer 138 which are still coated by the photoresist material. The remaining photoresist material covering layer 138 is thereafter removed by exposing wafer 130 to a strong organic solvent, a strong acid (such as, for example, chromic acid), or to atomic oxygen.

By the foregoing steps, wafer 130 has been prepared such that it is coated with a uniform layer 138 of silicon dioxide except immediately on top of regions 132 and 134. Thus, regions 132 and 134 of wafer 130 can now be doped with a suitable impurity. Doping may be accomplished by placing wafer 130 in a chamber containing some amount of the impurity material at an elevated temperature and allowing atoms of the impurity material to diffuse into the surface of wafer 130. Alternatively, the doping of regions 132 and 134 can be done using conventional ion implantation techniques. Importantly, the atoms of the impurity material will not penetrate the intact layer 138 of silicon dioxide. Therefore, only the exposed regions 132 and 134 of wafer 130 will become doped with the impurity, although region 136 will also become lightly doped as a result of diffusion from regions 132 and 134.

Once regions 132 and 134 have been doped with a suitable impurity, wafer 130 is again exposed to oxygen gas at a high temperature (1000° C.–1100° C.). This results in a layer of silicon dioxide being again grown over the entire surface of wafer 130.

Using the steps previously outlined, a portion of the silicon dioxide layer 138 adjacent region 136 of wafer 130 may be etched away, and a thinner layer of silicon dioxide may be provided on top of region 136, as illustrated in FIGS. 2A and 2B. Also, small portions of layer 138 above regions 132 and 134 are etched away such that electrical contact can be made through layer 138 with regions 132 and 134.

As a final step, suitable conductive regions 133, 135, and 140 are provided on top of silicon dioxide layer 138. For example, regions 133, 135, and 140 may be formed of aluminum metal and can be provided using conventional vapor deposition techniques.

4. Sensor System Circuitry

In use, the position sensor system of the present invention must, of course, be provided with appropriate means for detecting current flow between the source region and drain region of the FET position sensor. Such current flow is typically quite small. For example, if an object is positioned approximately 0.1 mm away from the FET, the current flowing through the FET may be as small as 60 microamps. Accordingly, the current detector which is used with the position sensor system of the present invention must be capable of accurately detecting and measuring such small currents.

Figure 6:
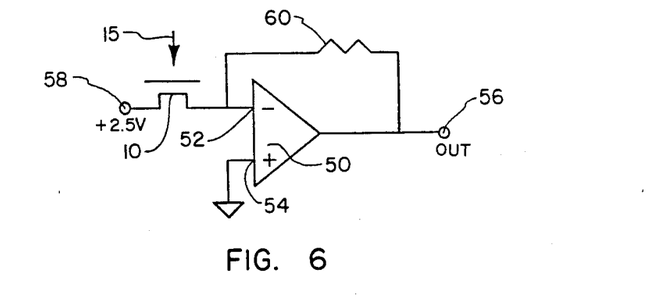
FIG. 6 is a schematic diagram illustrating one presently preferred embodiment of the electrical current detecting circuitry which may be used in association with the position sensor system of the present invention.

FIG. 6 illustrates a simple and presently preferred circuit arrangement which will adequately perform the required current-detecting function. The FET position sensor of the present invention is designated generally at 10 in FIG. 6. FET 10 is configured and fabricated as discussed in detail above.

The drain region of FET 10 is connected to a positive voltage source at 58. Thus, for example, if FET 10 is configured as illustrated in FIGS. 2A and 2B, region 132 would be connected by means of contact 133 to the voltage source at 58. The voltage provided at contact 58 may be any suitable voltage. For example, as indicated in FIG. 6, contact 58 may be maintained at approximately 2.5 volts.

The source region of FET 10 is connected to the inverting input 52 of an operational amplifier 50. Thus, for example, if FET 10 is configured as illustrated in FIGS. 2A and 2B, region 134 would be connected by contact 135 to inverting input 52 of amplifier 50.

The noninverting input 54 of amplifier 50 is connected to ground, as shown. Also, a feedback resistor 60 is provided between inverting input 52 and the output 56 of amplifier 50.

Amplifier 50 may comprise any suitable amplifier device. An operational amplifier, fabricated using conventional integrated circuit technology, is particularly well suited for use in connection with the present invention. One such operational amplifier is manufactured by National Semiconductor as Stock No. LM422. Optionally, using conventional integrated circuit techniques, a suitable amplifier 50 could be fabricated on the same substrate wafer which is used to form FET 10.

Feedback resistor 60 may also comprise any of a number of suitable resistors. The resistance of resistor 60 is selected so as to provide the circuitry of FIG. 6 with appropriate sensitivity in the desired operating range. Thus, for example, in the specific configuration illustrated in FIG. 6, resistor 60 may be selected so as to have a resistance of approximately 1K ohms.

In operation, the electric field emanating from an object whose position is being detected interacts with FET 10 as illustrated schematically by arrow 15. Such interaction causes the amount of current flowing through FET 10 to vary, thereby changing the effective resistance of FET 10. For example, in accordance with Ohms Law, an increase in the current flowing through FET 10 will result in a proportionate decrease in the effective resistance of FET 10.

The gain of amplifier 50 is directly related both to the value of resistor 60 and to the effective value of the resistance of FET 10. Specifically, the gain of amplifier 56 is approximately equal in magnitude to the resistance of resistor 60 divided by the effective resistance of FET 10. Thus, as the effective resistance of FIG. 10 is varied, the gain of amplifier 50 varies, thereby causing a change in the output voltage which is detected at output 56.

The voltage at output 56 of amplifier 50 can be readily monitored in any of a number of ways. For example, output 56 may be connected to an oscilloscope, to a strip-chart recorder, or to some other display/recording device. Output 56 could alternatively be connected to some sort of analog-to-digital converter such that the magnitude of the voltage at output 56 could be monitored digitally.

Importantly, as is apparent from the foregoing discussion, the magnitude of the voltage at output 56 of amplifier 50 is directly related to the current flowing through FET 10. The current flowing through FET 10 is, in turn, determined by the interaction of electric field 15 with FET 10. The interaction of the electric field 15 with FET 10 is a function of the position of the object from which electric field 15 emanates. Thus, by monitoring the voltage at output 56 of amplifier 50, information about the position of the object relative to FET 10 can be obtained.

It will be readily appreciated that other forms of electrical circuitry and other current detecting devices and apparatus could be used in connection with the position sensor system of the present invention with equally acceptable results. The circuitry illustrated in FIG. 6 merely depicts one way in which the current flowing through FET 10 can be appropriately detected and monitored. Advantageously, the circuitry illustrated in FIG. 6 is both simple and inexpensive and is, for that reason, presently preferred.

5. Sensor System Operation

In order to detect the position and/or movement of an object using the position sensor system of the present invention, it is first necessary to prepare the object whose position is to be detected such that an electric field emanates from the object. The electric field may have virtually any desired configuration. In most cases, however, it will be desirable to produce some type of non-uniform electric field. As used herein, the term "non-uniform" electric field means an electric field whose magnitude is dependent in some way upon the distance between the point of measurement and the object from which the electric field emanates.

An electric field which emanates from an object can be produced in a number of different ways.

One way of producing such an electric field is to provide the object with one or more electrets. The term "electret" is used herein to refer to a bounded region having a non-zero net electrical charge. The electret may be either "compensated" (relatively close to a ground plane) or "uncompensated" (relatively far from a ground plane). An object may be provided with an electret in a variety of ways.

For example, an object can be placed in the path of some sort of electron beam. A suitable electrom beam may be readily formed using a scanning electron microscope. Such an electron beam can be focused by the microscope to any appropriate diameter (such as, for example, 0.1 micron), and the beam can be guided across the object by computer. Many polymer materials can be provided with electrets in this manner, and the electrons embedded in the polymer will remain relatively immobile at room temperature over a period of a number of years.

It is also possible to provide an object with an electret by bringing a high voltage needle into the vicinity of the object. The coronal discharge from the needle to the object will force electrons into the object so as to form an electret.

A similar result can be obtained by placing a drop of conductive liquid on an object and then subjecting the liquid to a high voltage. The conductive liquid will convey charged conductors into the object, thereby creating an electret.

A suitable electric field emanating from an object can also be produced by providing the object with one or more regions having a net electric polarization. For example, the object may be placed in a strong electric field at an elevated temperature. At the elevated temperature, the molecules of the object are quite mobile and will begin to align themselves electrically. That is, the object will become polarized. When the object is thereafter cooled and then removed from the electric field, the molecules of the object will remain aligned so that the object maintains a net electric polarization which will produce an electric field.

Alternatively, portions of an object can be polarized by adsorbing certain protein molecules. Many proteins are known to have permanent electric dipoles. An object may, therefore, be brought into contact with such proteins such that protein molecules are adsorbed on the object. Portions of the object will thereby become polarized so as to produce an electric field.

A still further method for producing an electric field emanating from an object is to provide one or more conductive regions on the object. A substantially fixed voltage level may then be provided on the conductive regions so as to produce a suitable electric field.

The object whose position and/or movement is to be detected may have virtually any shape. The shape of the object as well as the specific configuration of the electric field emanating from the object will depend both upon the particular application and upon the type of information which one desires to obtain. This will become more readily apparent from the discussion which follows.

Figure 7:
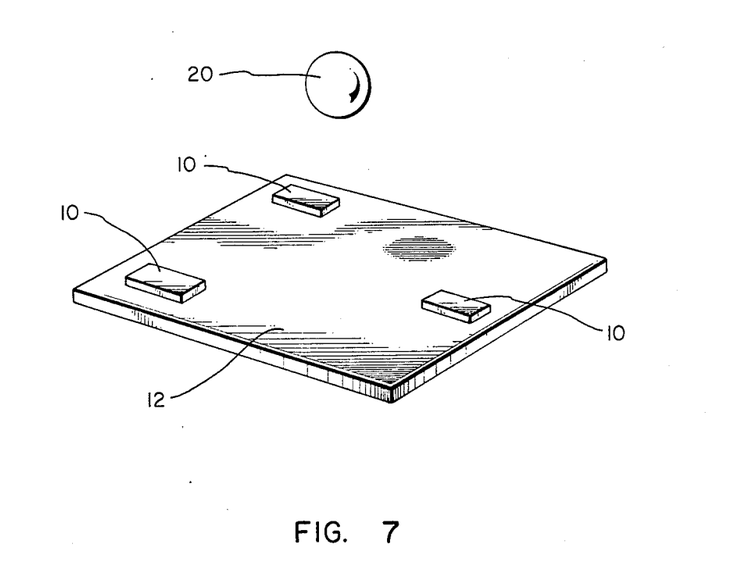
FIG. 7 is a perspective view of one presently preferred embodiment of a sensor system for detecting the position and movement of an object in multiple degrees of freedom.

As depicted in FIG. 7, an object 20 whose position one desires to detect may be configured as a sphere. Object 20 is prepared in accordance with one of the methods described above so as to produce an electric field. For example, object 20 could be prepared so as to have a substantially uniform surface charge. In such case, a radially dependent electric field will emanate from object 20.

The position of object 20 in three-dimensional space can be determined using three FETs 10 which may be affixed to a base 12, as shown. FETs 10 are configured and fabricated as described previously, and each FET 10 is provided with appropriate current detecting circuitry.

Prior to use, the threshold voltage of each FET 10 is set so as to establish a reference point from which the position of object 20 will be determined. For example, if FETs 10 are n-channel FETs and if a negative surface charge is placed upon object 20, FET 10 would be adjusted so as to have a negative threshold voltage. A suitable threshold voltage may, for example, be $-2.0$ volts. Alternatively, as discussed above, a biasing contact 242 (see FIG. 3) could be provided on each FET 10 to assist in establishing a desired reference point.

The current through each FET 10 is thereafter monitored, and such current can be used to determine the position of object 20 relative to each FET 10. With such information, the position of object 20 above base 12 can be determined at any given point in time and may be continuously monitored.

In some applications, it may not be sufficient to merely detect three-dimensional position, but some further information may be desired. In such case, the object whose position is being sensed would need to be prepared somewhat differently, and a larger number of FET 10 would be used.

Figure 8:
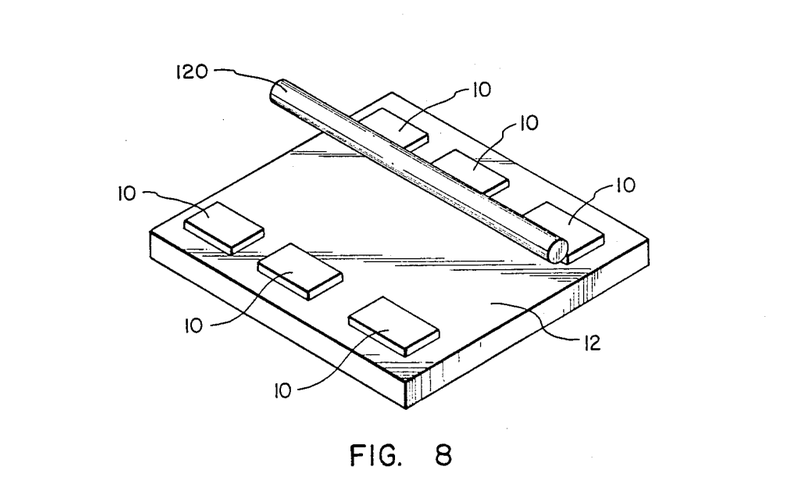
FIG. 8 is a perspective view of a second presently preferred embodiment of a sensor system for detecting the position and movement of an object in multiple degrees of freedom.

For example, FIG. 8 illustrates an object 120 which is configured as a rod. Object 120 is prepared using one of the methods described above and may, for example, be provided with a substantially uniform surface charge.

As depicted in FIG. 8, six FETs 10 may be mounted to a suitable base 12 in some desired arrangement. For example, FETs 10 may be arranged in two substantially parallel rows, as shown. Each FET 10 is provided with appropriate current detecting circuitry and is appropriately adjusted to establish a desired reference point.

By simultaneously monitoring the current through each FET 10 of FIG. 8, the position and movement of object 120 can be determined and monitored. Significantly, in addition to detecting the position of object 120 in three-dimensional space, the rotation of object 120 about one or more axes can also be determined.

As a general proposition, it is possible to obtain more information about an object (greater "resolution") by using a greater number of FETs 10. Thus, while the FET arrangement illustrated in FIG. 7 will provide only three-dimensional position information, the FET arrangement described in connection with FIG. 8 can provide both position and rotation information. As previously noted, the shape of the object and the configuration of the electric field will also influence the amount of information which can be obtained.

Figure 9:
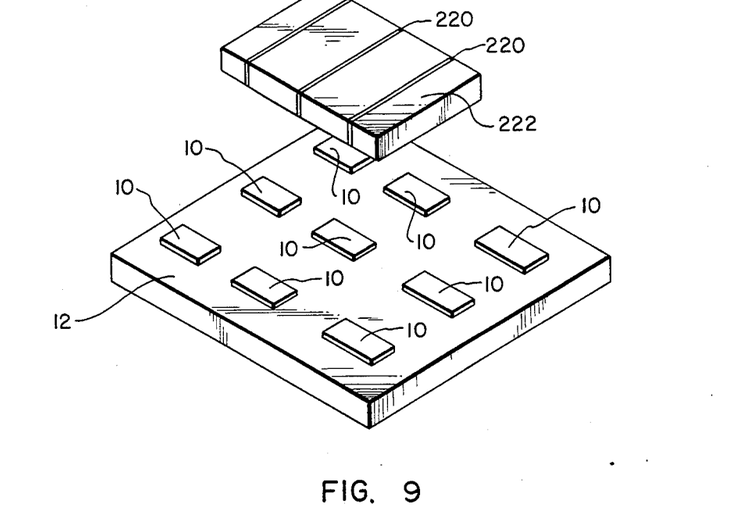
FIG. 9 is a perspective view of a third presently preferred embodiment of a sensor system for detecting the position and movement of an object in multiple degrees of freedom.

Referring now to FIG. 9, an object 222 whose position is to be detected is configured as a wafer. An array of nine FETs 10 is provided below object 222, FETs 10 being secured to a suitable base 12. FETs 10 may be arranged in any desired configuration on base 12 (such as, for example, in three separate rows). Each FET 10 is provided with suitable current detecting circuitry and is adjusted to establish a desired reference point.

Object 222 of FIG. 9 may be prepared in any of a number of ways using the methods described above. For example, if only general position information is needed, object 222 can be provided with a substantially uniform surface charge. Alternatively, object 222 can be prepared so as to have a non-uniform surface charge. Advantageously, a non-uniform surface charge could assist in providing additional information about the position and movement of object 222.

For example, as illustrated in FIG. 9, object 222 could be provided with a number of strips of charge 220. Strips 220 may, for example, be formed by passing object 222 under the focused beam of a scanning electron microscope. By preparing object 222 in this manner and by using a sufficient number of FETs 10, it is possible to detect even very slight changes in the position of object 222. Thus, such an arrangement can be used to increase the accuracy of the position measurement.

Figure 10:
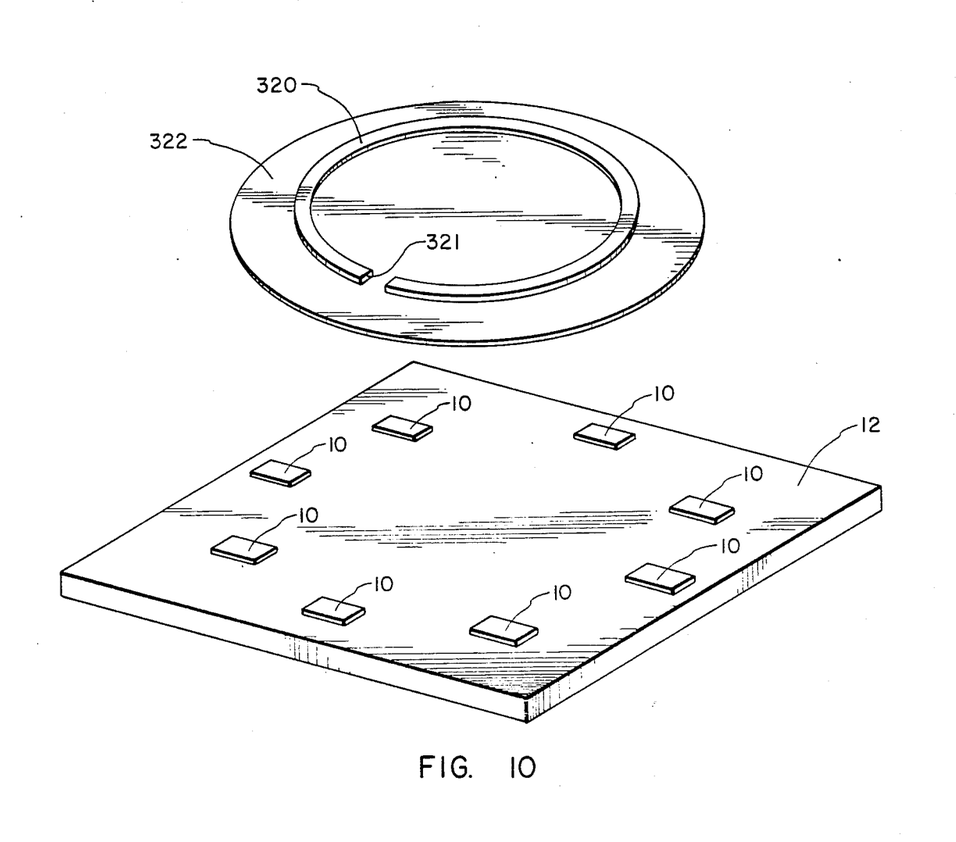
FIG. 10 is a perspective view of a fourth presently preferred embodiment of a sensor system for detecting the position and movement of an object in multiple degrees of freedom.

FIG. 10 illustrates yet another object and sensor arrangement. The object and sensor arrangement of FIG. 10 could, for example, be easily adapted for use in connection with a gyroscope.

As depicted in FIG. 10, the object 322 whose position is to be detected is configured as a substantially circular disc. Object 322 is prepared such that a suitable electric field emanates from object 322. For example, object 322 may be provided with a charged ring 320, as shown. Alternatively, object 322 may be provided with charged radial arms or with some other suitable pattern of charge.

As shown, a plurality of FETs 10 are provided on a suitable base 12 and are arranged in a substantially circular configuration. Once again, each FET 10 is provided with appropriate current detecting circuitry, and is adjusted to establish a reference point.

Object 322 of FIG. 10 could, for example, be rotated about a substantially perpendicular axis passing through the center of object 322. FETs 10 could then be used to detect any tilting of the rotational axis. Thus, the object and sensor arrangement of FIG. 10 could function as a highly sensitive gyroscope.

In some instances, it may also be desirable to count rotations and/or to monitor the speed at which object 322 is rotating about its axis. Accordingly, a break in ring 320 may be provided at 321. The break at 321 would, of course, modify the electric field which surrounds object 322. Such modification of the electric field could be detected and monitored, and the rotational speed of object 322 and/or the number of rotations made by object 322 could thereby be determined.

From the few examples described in connection with FIGS. 7-10, it will be readily appreciated that the object whose position is being detected can be configured in a virtually limitless number of ways. The particular way in which the object is configured will depend upon the information desired and upon the particular application. In addition, virtually any number of FETs 10 may be used. The number and arrangement of the FETs 10 will depend upon the type and amount of information desired.

As illustrated in FIGS. 7-10, it is presently preferred that FETs 10 be positioned directly within the electric field emanating from the object whose position is being detected. That is, as illustrated in FIG. 7, FETs 10 are positioned so as to be in the immediate vicinity of object 20 and to thereby interact directly with the primary field emanating from object 20. FETs 10 would, in theory, function adequately by interacting with a secondary electric field which might, for example, be transmitted from the immediate vicinity of an object along a wire. In practice, however, noise and other electrical interferences can make accurate measurements difficult using such an arrangement. Therefore, to increase the accuracy of the system, positioning FETs 10 directly within the electric field emanating from the object being monitored is preferred.

As illustrated above, FETs 10 can all be positioned with respect to the object being sensed so as to lie substantially in a single plane. Several FETs 10 may thus be provided on a single substrate base using conventional integrated circuit technology. In addition, with conventional integrated circuit techniques, appropriate current detecting circuitry could be provided on the same substrate base adjacent each FET 10. This makes it possible to manufacture a sensor system which is very small. Moreover, a relatively complex sensor system within the scope of the present invention can be manufactured fairly inexpensively using conventional technology, and there is no need for elaborate and expensive physical support structures.

6. Exemplary Applications

The exemplary applications set forth below illustrate some of the ways in which the novel position sensor systems and methods of the present invention can be used in practice. Those of ordinary skill in the art will, of course, readily appreciate that the number of specific applications of the position sensor systems and methods of the present invention is virtually limitless. Thus, the following exemplary applications are given by way of illustration only and are not intended to be exhaustive.

Figure 11:
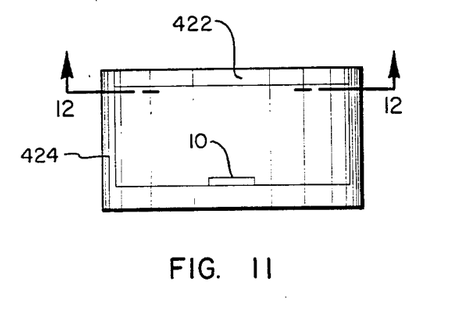
FIG. 11 is a side view of a pressure transducer which includes a position sensor system within the scope of the present invention.
Figure 12:
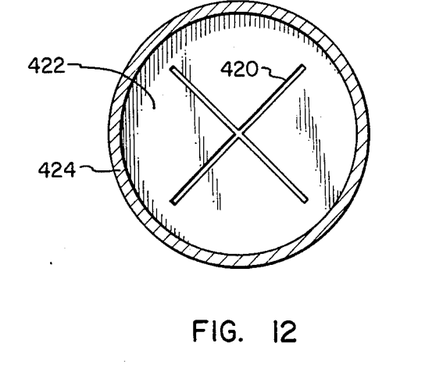
FIG. 12 is a cross-sectional view of the pressure transducer of FIG. 11 taken along lines 12—12 of FIG. 11.

FIGS. 11 and 12 illustrate one way in which the position sensor system of the present invention can be used so as to form a pressure transducer or strain gauge. As shown, an FET 10 may be provided within a substantially cylindrical housing 424. Importantly, the top and bottom ends of cylindrical housing 424 are sealed.

As shown best in FIG. 12, the top end of housing 424 may comprise a flexible membrane 422. Membrane 422 is provided with a charged region 420. For example, charged region 420 may be provided in flexible membrane 422 by placing membrane 422 under the focused beam of a scanning electron microscope.

From the foregoing description, it will be appreciated that when the pressure outside of housing 424 increases, membrane 422 will be deflected into housing 424 toward FET 10. Because of the charged region 420 on membrane 422, FET 10 will detect the deflection of membrane 422. The system may be appropriately calibrated by means which are well-known in the industry such that the pressure being exerted on membrane 422 can be determined.

Advantageously, the pressure transducer illustrated in FIGS. 11 and 12 may be made quite small using conventional integrated circuit technology. For example, the pressure transducer of FIGS. 11 and 12 could be made small enough to pass through the lumen of a hypodermic needle and comfortably reside within a blood vessel of an animal body. The pressure transducer of FIGS. 11 and 12 could, therefore, be used to continuously monitor a patient's blood pressure.

The device illustrated in FIGS. 11 and 12 could also be adapted for use as a multiple axis strain gauge. For example, by forming housing 424 of a flexible material, and by placing multiple FETs 10 within housing 424, the device could be used to sense pressure or strain in multiple dimensions by sensing the position and movement of membrane 422 in multiple degrees of freedom.

Figure 13:
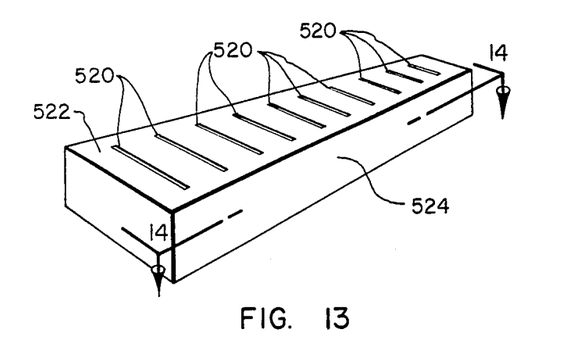
FIG. 13 is a perspective view of a transducer device which includes a position sensor system within the scope of the present invention.
Figure 14:
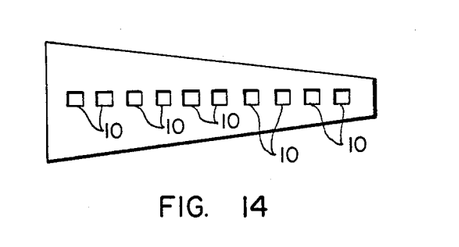
FIG. 14 is a cross-sectional view of the transducer of FIG. 13 taken along lines 14—14 of FIG. 13.

Another application of the position sensor system of the present invention is illustrated in FIGS. 13 and 14. As shown, a row of FETs 10 is provided within a housing 524. The width of housing 524 decreases along its length, as shown, and housing 524 is sealed so as to be substantially air tight.

The top of housing 52 comprises a flexible membrane 522. Membrane 522 has a plurality of charged regions 520 provided therein, such as, for example, by placing membrane 522 under the beam of a scanning electron microscope. The charged regions 520 in membrane 522 may be positioned so as to be substantially directly above an FET 10 within housing 524.

The device illustrated in FIGS. 13 and 14 could be used in a number of different ways. For example, the device could be used as a pressure transducer. In such case, membrane 522 will be deflected inwardly as a result of an increase in external pressure. Significantly, however, at a single pressure level, the widest portion of membrane 522 will be deflected a greater distance than the most narrow portion of membrane 522. Consequently, each of the FETs 10 within housing 524 will detect a slightly different range of pressures. Thus, the device of FIGS. 13 and 14 may provide more sensitive pressure detection over a broader pressure range than the pressure transducer illustrated in FIGS. 11 and 12.

The device illustrated in FIGS. 13 and 14 could also be used as a tactile sensor for a robot. FETs 10 could, in such an application, provide an indication of the tactile pressure being applied to membrane 522.

The device illustrated in FIGS. 13 and 14 could further be used to sense varying audio frequencies. Because the width of membrane 522 varies along the length of housing 524, each charged region 520 will vibrate in response to a slightly different frequency. The device of FIGS. 13 and 14 could thus be subjected to sound waves in such a way that each of the FETs 10 within housing 524 responds to a different audio frequency. In this way, the device of FIGS. 13 and 14 could, for example, function as an audio microphone.

Figure 15:
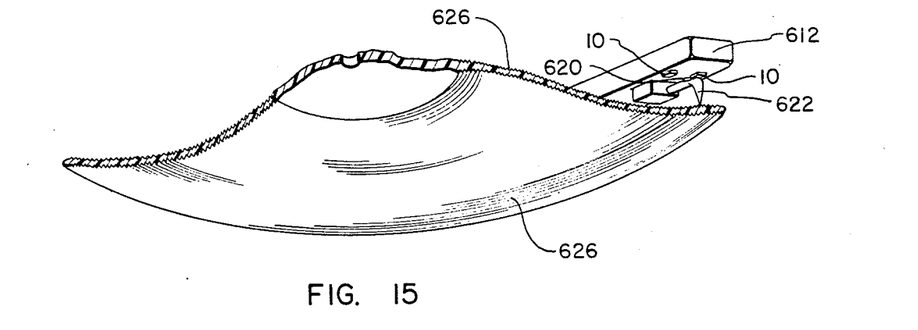
FIG. 15 is a perspective view of a stereo phonograph pick-up system which includes a position sensor system within the scope of the present invention.
Figure 15A:
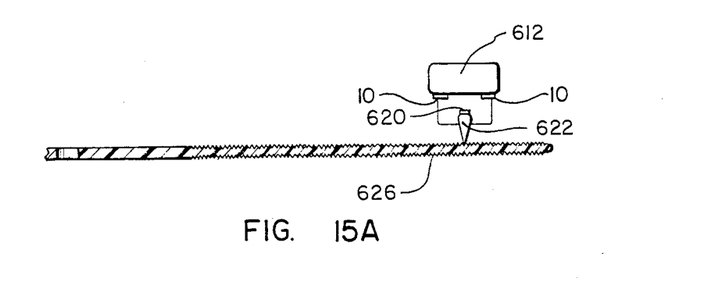
FIG. 15A is an end view of the pick-up system of FIG. 15.

Another application of the position sensor system of the present invention is illustrated in FIGS. 15 and 15A. As shown, a stereo needle 622 is secured to a support arm 612 of a stereo turntable. Needle 622 is provided with a charged region 620 on a top portion thereof. Two FET position sensors 10 are provided on support arm 612, as illustrated, to detect movement of the charged region 620 and needle 622.

As record 626 rotates on a turntable, needle 622 will vibrate as it travels along the grooves of record 626 in conventional fashion, with the vibrations along two substantially perpendicular axes corresponding to the two stereo channels. The vibrations along each axis are separately detected by the two FETs 10, and each FET 10 thus detects a separate stereo channel. Accordingly, FETs 10 may be used as illustrated in FIGS. 15 and 15A to form a lightweight stereo pick-up system.

7. Summary

From the above discussion, it will be appreciated that the present invention provides a system and method for sensing the position and/or movement of an object in multiple degrees of freedom. The position sensor system of the present invention can be readily constructed using conventional integrated circuit technology and is readily adapted for manufacture and use in association with semiconductors and conventional integrated circuits. Significantly, the present invention provides a position sensor system and method which is both simple and inexpensive in construction and use.

The position sensor system of the present invention can be formed so as to have dimensions on the order of a number of microns. Thus, the present invention also provides a position sensor system which is capable of being manufactured and used on an extremely small size scale. In addition, since the conductive gate of the FET sensor of the present invention can be substantially completely surrounded by an insulating material, the sensor system of the present invention is not unduly affected by the presence of common impurities.

The invention may be embodied in other specific forms without departing from its spirit or essential characteristics. The described embodiments are to be considered in all respects only as illustrative and not restrictive. The scope of the invention is, therefore, indicated by the appended claims, rather than by the foregoing description. All changes which come within the meaning and range of equivalency of the claims are to be embraced within their scope.

What is claimed and desired to be secured by United States Letters Patent is:

1. A sensor system for detecting the position and movement of an object, the system comprising:
    means for producing an electric field which emanates from the object;
    a field-effect transistor positioned in the vicinity of the object so as to be located directly within said electric field, the field-effect transistor having a source region, a drain region, and a channel region, the source and drain regions being separated by the channel region; and
    means for detecting variations caused by said electric field in the conductivity of the channel region of the field-effect transistor, whereby information about the position and movement of the object relative to the channel region of the field-effect transistor can be obtained.

2. A sensor system as defined in claim 1 wherein the electric field producing means comprises means for forming a bounded region having a non-zero net electrical charge.

3. A sensor system as defined in claim 2 wherein the bounded region forming means comprises an electret having a substantially constant, non-zero net electrical charge.

4. A sensor system as defined in claim 2 wherein the bounded region forming means comprises an electrical conductor having a substantially fixed voltage level.

5. A sensor system as defined in claim 1 wherein the electric field producing means comprises for forming a bounded region having a non-zero net electric polarization.

6. A sensor system as defined in claim 1 wherein the electric field is a non-uniform electric field.

7. A sensor system as defined in claim 1 wherein the field-effect transistor further comprises a conductive gate positioned adjacent to the channel region of the field-effect transistor.

8. A sensor system as defined in claim 7 wherein the conductive gate is formed of a conductive metal material.

9. A sensor system as defined in claim 7 wherein the conductive gate is formed of a polycrystalline silicon material.

10. A sensor system as defined in claim 7 wherein the conductive gate is electrically insulated from the channel region of the field-effect transistor.

11. A sensor system as defined in claim 7 wherein the conductive gate is substantially completely surrounded by an insulating material.

12. A sensor system as defined in claim 11 wherein the insulating material comprises silicon dioxide.

13. A sensor system as defined in claim 1 wherein the field-effect transistor further comprises a biasing contact positioned adjacent to the channel region of the field-effect transistor.

14. A sensor system as defined in claim 1 wherein the source region of the field-effect transistor is a substantially circular region and wherein the channel region and drain region of the field-effect transistor are substantially concentric, annular regions which encircle the source region.

15. A sensor system for detecting the position and movement of an object, the system comprising:
means for forming at least one bounded region having a non-zero net electrical charge, said bounded region being configured and positioned so as to produce a non-uniform electric field which emanates from the object;
at least one field-effect transistor positioned in the vicinity of the object, each field-effect transistor having a source region, a drain region, and a channel region, the source and drain regions being separated by the channel region, each field-effect transistor also comprising a conductive gate positioned adjacent to but electrically insulated from the channel region of the field-effect transistor; and
means for detecting variations caused by said electric field in the conductivity of the channel region of each field-effect transistor, whereby information about the position and movement of the object relative to the channel region of each field-effect transistor can be obtained.

16. A sensor system as defined in claim 15 wherein there are a plurality of field-effect transistors positioned in the vicinity of the object.

17. A sensor system as defined in claim 16 wherein the field-effect transistors are substantially co-planar.

18. A sensor system as defined in claim 16 wherein the field-effect transistors are positioned so as to be located directly within the electric field which emanates from the object.

19. A sensor system as defined in claim 18 wherein the conductive gate of each field-effect transistor is substantially completely surrounded by an insulating material.

20. A sensor system as defined in claim 19 wherein the conductive gate of each field-effect transistor is formed of a polycrystalline silicon material.

21. A sensor system as defined in claim 19 wherein the source region of each field-effect transistor is a substantially circular region and wherein the channel region and drain region of each field-effect transistor are substantially concentric, annular regions which encircle the source region.

22. A sensor system as defined in claim 19 wherein the bounded region forming means comprises an electret having a substantially constant, non-zero net electrical charge.

23. A sensor system as defined in claim 19 wherein the bounded region forming means comprises an electrical conductor having a substantially fixed voltage level.

24. A sensor system as defined in claim 19 wherein each field-effect transistor further comprises a biasing contact positioned adjacent to but insulated from the conductive gate.

25. A sensor system as defined in claim 15 wherein the field-effect transistors are n-channel field-effect transistors.

26. A sensor system as defined in claim 25 wherein the field-effect transistors have a negative threshold voltage.

27. A sensor system, comprising:
an object which comprises at least one electret having a substantially constant, non-zero net electrical charge, the electret being configured and positioned so as to produce a non-uniform electric field around the object;
a plurality of field-effect transistors positioned in the vicinity of the object so as to be located directly within said electric field, the field-effect transistors being substantially coplanar and each field-effect transistor having a source region, a drain region, and a channel region, the source and drain regions being separated by the channel region, each field-effect transistor also comprising a conductive gate positioned adjacent to but electrically insulated from the channel region of the field-effect transistor, the conductive gate being substantially completely surrounded by an insulating material; and
means for detecting variations caused by said electric field in the conductivity of the channel region of each field-effect transistor, whereby the position and movement of the object can be determined.

28. A sensor system as defined in claim 27 wherein the object comprises a plurality of electrets and wherein the electrets of the object are discrete, substantially linear regions which are substantially parallel to one another.

29. A sensor system as defined in claim 27 wherein the object is configured as a substantially circular disc and wherein the electret is configured as a substantially circular ring which is substantially concentric with the disc.

30. A sensor system as defined in claim 27 wherein the object comprises a flexible membrane and wherein the position and movement of the membrane are dependent upon the amount of pressure which is exerted upon the membrane.

31. A sensor system as defined in claim 27 wherein the object is a stereo phonograph needle.

32. A sensor system as defined in claim 27 wherein the drain region of each field-effect transistor is a substantially circular region and wherein the channel region and source region of each field-effect transistor are substantially concentric, annular regions which encircle the drain region.

33. A sensor system as defined in claim 27 wherein each field-effect transistor further comprises a biasing contact positioned adjacent to but insulated from the conductive gate.

34. A sensor system as defined in claim 27 wherein the means for detecting variations in conductivity comprises an operational amplifier.

35. A method for sensing the position and movement of an object, the method comprising the steps of:
preparing the object such that an electric field emanates from the object;
positioning at least one field-effect transistor in the vicinity of the object, the field-effect transistor having a source region, a drain region, and a channel region, the source and drain regions being separated by the channel region;
establishing an electrical voltage difference between the source region and drain region of the field-effect transistor; and
detecting variations caused by said electric field in the conductivity of the channel region of the field-effect transistor, whereby information about the position and movement of the object relative to the channel region of the field-effect transistor can be obtained.

36. A method as defined in claim 35 wherein the preparing step comprises preparing the object such that a non-uniform electric field emanates from the object.

37. A method as defined in claim 35 wherein the preparing step comprises providing the object with at least one bounded region having a non-zero net electrical charge.

38. A method as defined in claim 37 wherein said bounded region comprises an electret having a substantially constant, non-zero net electrical charge.

39. A method as defined in claim 37 wherein said bounded region comprises an electrical conductor having a substantially fixed voltage level.

40. A method as defined in claim 35 wherein the preparing step comprises providing the object with at least one bounded region having a non-zero net electric polarization.

41. A method as defined in claim 35 wherein the positioning step comprises positioning the field-effect transistor in the vicinity of the object so as to be located directly within said electric field.

42. A method as defined in claim 35 wherein the positioning step comprises positioning a plurality of field-effect transistors in the vicinity of the object.

43. A method as defined in claim 42 wherein the field-effect transistors are substantially coplanar.

44. A method as defined in claim 35 wherein the field-effect transistor comprises a biasing contact positioned adjacent to the channel region and further comprising the step of fixing the voltage level of the biasing contact so as to establish a desired reference point from which the position of the object is to be determined.

* * * * *